United States Patent

[11] 3,607,804

| [72] | Inventor | Akihiro Nishimura<br>Williamsburg, Va. |
|---|---|---|
| [21] | Appl. No. | 842,390 |
| [22] | Filed | July 16, 1969 |
| [45] | Patented | Sept. 21, 1971 |
| [73] | Assignee | Dow Badische Company<br>Williamsburg, Va. |

[54] DYEABLE PILL RESISTANT POLYESTERS
16 Claims, No Drawings

[52] U.S. Cl....................................................... 260/22 D,
8/DIG. 4, 8/DIG. 11, 260/22 CB, 260/75 R, 260/873
[51] Int. Cl......................................................... C08f 21/04, C08g 17/16
[50] Field of Search............................................ 260/22 D, 75, 873, 887, 22

[56] References Cited
UNITED STATES PATENTS

| 3,135,716 | 6/1964 | Uraneck et al. | 260/76 |
| 3,256,304 | 6/1966 | Fischer et al. | 260/407 |
| 3,285,872 | 11/1966 | Faber | 260/30.4 |
| 3,311,578 | 3/1967 | Laakso | 260/22 |
| 3,383,343 | 5/1968 | Mohajer et al. | 260/22 |
| 3,390,108 | 6/1968 | Keck et al. | 260/7.5 |

FOREIGN PATENTS

| 745,690 | 11/1966 | Canada | 260/75 |

OTHER REFERENCES

Emery Industries, Specifications and Characteristics of Emery Fatty Acids and Organic Chemicals, EY-OF-736 June 1966 E-20

Primary Examiner—Donald E. Czaja
Assistant Examiner—Ronald W. Griffin
Attorney—Plumley, Tyner & Sandt

ABSTRACT: Improved polyesters consist of the condensation product of a polyhydric alcohol, a major proportion of a first dibasic acid, a minor proportion of a long chain dibasic acid having molecular weight of 550 to 2,500, and optionally, a minor proportion of a long chain polyfunctional compound having 30 to 60 carbon atoms and at least three reactive sites.

DYEABLE PILL RESISTANT POLYESTERS

BACKGROUND OF THE INVENTION

This invention relates to a polyester which is capable of forming films, fibers and filaments suitable for use in the textile industry. In one aspect, it relates to a polyester composition having improved dyeability with disperse dyes and improved pilling resistance. In another aspect, it relates to an improved polyethylene terephthalate.

Polyesters in recent years have been increasingly used in the textile industry. Filaments of the aromatic polyester resins, and particularly, polyethylene terephthalate, have found application not only in clothing, but also in areas where heavy wear is anticipated, such as in carpets. The production of fiber forming linear polyesters of terephthalic acid and an ethylene glycol has been disclosed by Whinfield and Dickson in U.S. Pat. No. 2,465,319. Fabrics produced from polyethylene terephthalate have become well accepted for their ease-of-care properties associated with fast drying, crease recovery, wrinkle resistance and abrasion resistance. However, these staple fibers have two large drawbacks in certain end uses. One is a phenomenon called "pilling" which is a term used to refer to the formation of many small fuzz balls caused by the entanglement of loose broken fibers. The other problem is a rather poor disperse dyeability which is caused by the highly crystalline and oriented structure of polyethylene terephthalate.

A number of attempts have been made to modify the molecular structure of polyesters in order to make these polymers more dye receptive. In general, these attempts have involved introducing noncrystallizable, flexible compounds into the esterification product in order to provide dye-receptive amorphous regions in the polyester molecules. In this regard, the use of polyalkylene oxide to modify polyesters was suggested in British Pat. No. 779,054. The use of a glycol from the dimer of a fatty acid was proposed in the U.S. Pats. Nos. 2,347,562 and 3,091,600, and the use of the dibasic acid dimer of a fatty acid was proposed in U.S. Pat. No. 3,390,108.

These proposed modifications of the polyester molecule have not been entirely successful, however. The addition of polyalkylene oxide for example, causes the polymer to have much worsened light stability. Furthermore, the copolyesters formed from these long chain aliphatic compounds show a greatly reduced melt viscosity compared to the unmodified polyester. For example, the incorporation of 5 mol percent of the dimer of a fatty acid into polyethylene terephthalate has been shown to reduce the melt viscosity at 288° C. from 4,500 poise to 2,300 poise. While such a reduction is sometimes advantageous, in many instances it is necessary that sufficiently high melt viscosity be maintained in order that satisfactory spinning under practical conditions can take place.

It is, therefore, an object of this invention to modify polyesters in order to improve their disperse dyeability while maintaining a satisfactory melt viscosity and satisfactory light stability.

An additional problem faced by users of polyesters arises from the phenomenon called "pilling." Pills are formed when short, smooth fibers work their way through the fabric surface where they become entangled with each other. All types of synthetic fibers, including polyamides, acrylics and polyesters are subject to pilling, thus indicating that this defect is associated more with the physical properties of the fibers, such as strength, extensibility, smoothness and length rather than with the chemical structure. Most attempts to overcome the pilling problem have been directed at incorporating into the fabric suitable proportions of weakened fibers or fibers which are specially weakened during finishing or processing of the fabric. Because of these points of weakness in the textile fibers, the pills which form will be more easily brushed away and, in fact, if they can be removed as fast as they are formed, the pilling problem is overcome for all practical purposes.

It is, therefore, an object of this invention to produce a polyester fiber which is resistant to pill formation.

While many suggestions have been made for improving the pilling resistance of polyesters, just as many suggestions have been made for improving the disperse dyeability of polyesters, the improvements suggested to overcome one problem are rarely helpful, and are quite often harmful, to the solution of the other.

It is, therefore, a further object if this invention to produce a polyester which has both improved disperse dyeability and improved pill resistance.

STATEMENT OF THE INVENTION

According to the invention, a polyester of improved properties comprises structural units of
1. a polyhydric alcohol
b 2. a first dibasic acid of aromatic character
3. a second dibasic acid which is a dicarboxylic acid-terminated long chain aliphatic compound having a molecular weight of 550 to 2,500.

Optionally, the above polymer is further modified by the presence of structural units of a polyfunctional compound reactable with the other components having 30 to 60 carbon atoms and at least three reactive sites.

The first dibasic acid is the major proportion of the acid component, comprising 91.5 to 99 percent of the total acid. The second dibasic acid comprises from 1.0 to 7.0 mol percent of the total acid. The polyfunctional compound, when present, comprises from 0.05 to 1.5 mol percent of the total acids. (For the purpose of calculation of proportions, the polyfunctional compound is considered as an acid component regardless of the nature of its terminal groups.)

PREFERRED EMBODIMENTS

The presently preferred embodiment of my invention is the polymer which is formed by esterifying ethylene glycol with terephthalic acid, a dicarboxy terminated polybutadiene having a molecular weight from 750 to 1,200, and optionally the tricarboxylic acid 54 carbon atom trimer of a fatty acid. The amount of polyhydric alcohol used in the esterification reaction ill be stoichiometrically calculated to esterify completely or substantially completely all of the carboxyl groups present in the reaction system from the total acids in the composition.

The major acid component in my composition is a dibasic acid of aromatic character. Any dibasic acid which will upon esterification produce a filament-forming resin can be used. The phthalic acids, and terephthalic acid in particular, are the most suitable for fiber forming compositions, as described in U.S. Pat. No. 2,465,319. This first acid is present in an amount from 91.5 to 98.95 mol percent, based upon the total acids present.

The second acid present in the system is a dibasic long chain aliphatic acid having a molecular weight of from 550 to 2,500, and preferably from 750 to 1,200. This acid is primarily responsible for the improvement in disperse dyeability of the finished composition. It is necessary that the second acid have a high molecular weight in order to avoid the serious depression of the melting point caused by low molecular weight copolymerizable acids. Depression of the melting point is proportional to the mol percent of the second acid component used, rather than the weight percent. Therefore, by using a high molecular weight second acid, a large weight percent of the second acid can be tolerated without substantial depression of the melting point. On the other hand, the improvement in disperse dyeability appears due to the weight percent of the second acid. Therefore, by using a small mol percent of a high molecular weight acid, I am able to improve the disperse dyeability without serious depression of the melting point.

Dibasic acid of molecular weights between 550 and 2,500 l can be conveniently produced by the formation of terminally reactive polymers according to the process set forth in U.S. Pat. No. 3,135,716. As is disclosed in that patent, it is possible to produce dicarboxy terminated polymers from conjugated dienes of 4 to 12 carbon atoms, and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. I have found that polymers of butadiene are the most preferred. For the practice of my invention such polymers should have a molecular weight between 550 and 2,500, and preferably between 750 and 1,200.

High molecular weight acids produced by methods other than that disclosed in U.S. Pat. No. 3,135,716 are equally operable in the practice of my invention. Any acid which contains two carboxyl groups, has a molecular weight within the above stated range, and contains no substituents which are reactive with other materials in the composition will be satisfactory. In order to avoid discoloration of the ultimate polymer, it is preferable that this dibasic acid contain no points of unsaturation, and starting materials or processing techniques should be chosen accordingly.

The polyfunctional compound which is optionally used in compositions of my invention contain 30 to 60 carbon atoms and at least three terminal groups which will react with carboxylic or hydroxyl radicals so that the polyfunctional molecule will be incorporated into the polymer chain. These terminal reactive groups may, therefore, by hydroxyls, carboxylic acids, esters of carboxylic acids, isocyanated, or amines.

The purpose of the polyfunctional compound is to enchance the melt viscosity of the composition, thus counteracting the depression of melt viscosity which is inherent in introduction of the long chain dicarboxylic acid. The presence if the polyfunctional compound also serves to provide a point of brittleness in the molecule, thus permitting relatively easy breaking of the fibers and consequent resistance to pill formation.

Polyfunctional compounds having more than 30 carbon atoms are to be preferred. When shorter chain polyfunctional compounds are used, there is a serious problem of gel formation caused by the cross-linking through small molecules. Compounds containing about 50–50 carbon atoms appear to operate satisfactorily. In the currently preferred embodiment, I use a polyfunctional compound derived from a trimer of an 18 carbon atom fatty acid (54 carbon atoms). The tricarboxylic acid trimer of a $C_{18}$ fatty acid is commercially available, and is conveniently used in the practice of the invention. Trimers of oleic, linoleic and linolenic acid are suitable. As noted above, however, the acid groups can be converted to hydroxyl or other reactive groups prior to use.

The polyfunctional compound is responsible for resistance of the polymer to pill formation. It is known that there is a close relationship between breaking tenacity and breaking elongation of the fiber. That is, the higher the breaking tenacity, the lower breaking elongation would be or vice versa. In order to achieve a low pill polyester, it is necessary that both breaking tenacity and elongation fall within a certain range. Test results have indicated that a fiber having a breaking tenacity of 1.5–3.0 g./d. and a breaking elongation of 15–30 percent will have satisfactory pill resistance. With regard to the commercial polyesters, and particularly, polyethylene terephthalate, this means that it is necessary to produce a fiber having lower than usual breaking tenacity without an increase in the breaking elongation. Under the usual spinning conditions, however, these properties are not achieved, with excessive breaking elongation normally resulting when the tenacity is reduced. However, I have found that introduction of a polyfunctional compound into the molecule permits control of breaking tenacity and elongation within the desired ranges.

The polyfunctional compound, when incorporated into my composition, is present in a concentration range from about 0.05 to 1.5 mol percent based upon the total acid content. The optimum amount of polyfunctional compound to be used will vary depending upon the specific polyfunctional compound. In general, a lower content of more rigid molecules will be incorporated, whereas a larger content of the more flexible molecules can be tolerated. When using the trimer of a $C_{18}$ fatty acid, a concentration in the range of 0.1 to 1.0 mol percent is preferred. The use of saturated polyfunctional compounds is preferred.

As is understood in the art, it is possible to synthesize polyesters through several different routes. Thus, the polymers of our invention can be produced by the reaction of carboxylic acids with polyhydric alcohols and it will also be apparent that other reactions may be used to achieve a molecular structure identical to that produced by the acid-alcohol condensation. The claims to my invention are therefore directed to the ultimate chemical structure formed, regardless of the process used to produce the structure. As will be apparent from the examples below, a generally preferred process for the production of polyesters is the transesterification reaction between glycol and carboxylic acid esters.

EXAMPLE 1

730 g., bishydroxyethyl terephthalate, 100 g., of bishdroxyethyl saturated polybutadiene dicarboxylate (MW 850) and 28 g. trihydroxyethyl trimerate were placed in a stainless steel reaction vessel equipped with a stirrer, a distillation column, the series of traps and a nitrogen inlet. An ethylene glycol solution of 0.67 g. antimony triacetate as a polycondensation catalyst, and 0.90 g. tri-nonyl phenyl phosphite as a heat stabilizer were added. The reaction mixture was heated under nitrogen while stirring until the temperature reached 285° C, then vacuum was applied slowly over a period of three hours. After the maximum vacuum of 0.01 mm., Hg was reached, the reaction mixture as held under this condition for an additional two hours. The copolyester thus formed had a melt viscosity of 3800 poise at 290° C. The melting point as 249° C. The fiber spun from this copolyester showed a breaking tenacity of 2.4 g./d., and breaking elongation of 16 percent. Dyeing in 2 percent Palanil Blue R without carrier gave a fiber with complete dye penetration.

EXAMPLE 2

A polyester with 97.0/2.5/0.5 ethylene terephthalate/ethylene saturated polybutadiene dicarboxylate/ethylene trimerate (mole percent) was prepared in a manner similar to that described in example 1. The spun fiber was dyed without carrier in 2.0 percent Palanil Blue R. The cross section of the dyed fiber showed complete dye penetration. The fiber had a breaking tenacity of 3.1 g./d., and a breaking elongation of 24 percent.

EXAMPLE 3

A series of polymers was prepared in a similar manner to the process of example I from ethylene glycol, terephthalic acid, carboxy terminated polybutadiene, and, optionally, $C_{54}$ trimer acid. Table I shows the properties of filaments prepared from these polymers.

TABLE I.—COMPOSITIONS OF COPOLYESTERS CONTAINING CARBOXY TERMINATED POLYBUTADIENE

|  | I | II | III | IV | V | VI | VII | VIII | IX |
|---|---|---|---|---|---|---|---|---|---|
| Terephthalic acid (percent) | 98.0 | 97.0 | 95.5 | 99.0 | 95.0 | 93.5 | 94.0 | 95.0 | 95.0 |
| CT polybutadiene (percent) | [1] 1.5 | [1] 2.5 | [2] 4.0 | | [2] 3.0 | [3] 5.3 | [3] 4.9 | [1] 5.0 | [1] 5.0 |
| Trimer acid (percent) | 0.5 | 0.5 | 0.5 | 1.0 | 0.7 | 0.7 | 1.1 | | |
| IV | 0.75 | 0.68 | 0.66 | 0.72 | 0.72 | 0.78 | 0.69 | 0.68 | 0.68 |
| Draw ratio | 3.2 | 3.3 | 3.0 | 2.5 | 2.8 | 2.7 | 2.5 | 4.5 | 2.5 |
| Breaking tenacity (g./d.) | 3.0 | 3.1 | 2.8 | 2.0 | 2.4 | 2.5 | 2.2 | 5.3 | 2.8 |
| Breaking elongation (percent) | 21 | 24 | 18 | 16 | 16 | 17 | 12 | 22 | 64 |
| M.P (° C.) | 258 | 254 | 249 | 259 | 249 | 247 | 248 | 247 | 248 |

[1] M.W. 1,000.  [2] M.W. 850.  [3] M.W. 1,200.

NOTE.—All percentages are mol percent based on total acid used.

What is claimed is:
1. A filament-forming polyester comprising structural units of
   A. a glycol
   B. polycarboxylic acids, comprising
      1. 91.5 to 99 mol percent of a first dibasic aromatic acid, and
      2. 1.0 to 7.0 mol percent of a long chain aliphatic dibasic acid having a molecular weight of 750 to 2,500, which contains no substituents which are reactive with other materials in the composition.
2. The polyester of claim 1 wherein said polyhydric alcohol is ethylene glycol.
3. The polyester of claim 1 wherein said first dibasic acid is terephthalic acid.
4. The filament-forming polyester of claim 1 wherein said polycarboxylic acids consist of 93 mol percent of said first dibasic acid and 7 mol percent of said long chain aliphatic dibasic acid.
5. A filament-forming copolyester comprising structural units of
   A. 91.5 to 99 mol percent of terephthalic acid, 1.0 to 7.0 mol percent of dicarboxy terminated polybutadiene having a molecular weight of 750 to 1,200, and
   B. ethylene glycol
6. A filament-forming polyester comprising structural units of
   A. a glycol,
   B. polycarboxylic acids, comprising
      1. 91.5 to 99 mol percent of a first aromatic dibasic acid, and
      2. 1.0 to 7.0 mol percent of a carboxy terminated polymer of a conjugated diene having a molecular weight of 550 to 2,500.
7. The polyester of claim 6 wherein said diene is butadiene.
8. The polyester of claim 6 herein said polymer of a conjugated diene is a carboxy terminated polybutadiene having a molecular weight of 750 to 1,200.
9. The polyester of claim 1 further comprising structural units of 0.05 to 1.5 mol percent of a polyfunctional compound having reactive groups selected from hydroxyl, carboxylic acid, carboxylic acid ester, isocyanate and amine.
10. The polyester of claim 9 wherein said polyfunctional compound is a tribasic acid.
11. The polyester of claim 9 wherein said polyfunctional compound has 50 to 60 carbon atoms.
12. The polyester of claim 9 wherein said polyfunctional compound is a tribasic acid of 54 carbon atoms.
13. The polyester of claim 9 wherein said polyfunctional compound is a trimer of a fatty acid.
14. The polyester of claim 9 wherein said polyfunctional compound is the trimer of an 18 carbon atom fatty acid.
15. The polyester of claim 9 wherein said polyfunctional compound is the trimer of oleic, linoleic, or linolenic acid.
16. A filament-forming copolyester comprising structural units of
   A. 91.5 to 98.95 mol percent of terephthalic acid, 1.0 to 7.0 mol percent of dicarboxy terminated polybutadiene having a molecular weight of 750 to 1,200, 0.05 to 1.5 mol percent of the trimer of an 18 carbon atom fatty acid, and
   B. ethylene glycol.

UNITED STATES PATENT OFFICE
CERTIFICATE OF CORRECTION

Patent No. 3,607,804          Dated September 21, 1971

(Serial No. 842,390)
Inventor(s) Akihiro Nishimura

It is certified that error appears in the above-identified patent and that said Letters Patent are hereby corrected as shown below:

| Column | Line | Error |
|---|---|---|
| 2 | 41 | "ill" should be ---will--- |
| 3 | 23 | "by" should be ---be--- |
| 3 | 24 | "isocyanated" should be ---isocyanates--- |
| 3 | 28 | "if" should be ---of--- |
| 4 | 40 | "as" should be ---was--- |
| 4 | 42 | "as" should be ---was--- |
| 6 | 5 Claim 8 | "herein" should be ---wherein--- |

Signed and sealed this 3rd day of July 1973.

(SEAL)
Attest:

EDWARD M. FLETCHER, JR.
Attesting Officer

Rene Tegtmeyer
Acting Commissioner of Patents